US009018296B2

(12) United States Patent
Lee et al.

(10) Patent No.: US 9,018,296 B2
(45) Date of Patent: Apr. 28, 2015

(54) THERMOPLASTIC RESIN COMPOSITION HAVING EXCELLENT SURFACE GLOSS, REFLECTANCE, ANTI-YELLOWING PROPERTY AND MOLDABILITY

(71) Applicant: Cheil Industries Inc., Gumi-si (KR)

(72) Inventors: Sang Hwa Lee, Uiwang-si (KR); Jong Cheol Lim, Uiwang-si (KR); In Geol Baek, Uiwang-si (KR); Yoo Jin Jung, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/044,906

(22) Filed: Oct. 3, 2013

(65) Prior Publication Data

US 2014/0187662 A1 Jul. 3, 2014

(30) Foreign Application Priority Data

Dec. 31, 2012 (KR) ........................ 10-2012-0158196

(51) Int. Cl.
*C08K 3/32* (2006.01)
*C08L 77/06* (2006.01)

(52) U.S. Cl.
CPC ...................................... *C08L 77/06* (2013.01)

(58) Field of Classification Search
USPC ........................................................ 524/414
See application file for complete search history.

(56) References Cited

U.S. PATENT DOCUMENTS

| | | | |
|---|---|---|---|
| 4,177,185 A | 12/1979 | Tacke et al. | |
| 4,185,044 A | 1/1980 | Tacke et al. | |
| 5,256,718 A | 10/1993 | Yamamoto et al. | |
| 5,849,380 A | 12/1998 | Kashiba et al. | |
| 5,863,974 A | 1/1999 | Tjahjadi et al. | |
| 6,506,830 B1 | 1/2003 | Bussi et al. | |
| 8,178,608 B2 | 5/2012 | Nakamura et al. | |
| 8,304,481 B2 | 11/2012 | Nakamura et al. | |
| 8,426,549 B2 | 4/2013 | Ogasawara | |
| 2004/0102604 A1 | 5/2004 | Bassler et al. | |
| 2004/0175466 A1 | 9/2004 | Douglas et al. | |
| 2005/0113532 A1 | 5/2005 | Fish, Jr. et al. | |
| 2008/0146718 A1 | 6/2008 | Gijsman et al. | |
| 2009/0069479 A1 | 3/2009 | Seki | |
| 2010/0113656 A1 | 5/2010 | Saga | |
| 2010/0227957 A1 | 9/2010 | Fujii | |
| 2012/0165448 A1 | 6/2012 | Lee et al. | |
| 2012/0305287 A1 | 12/2012 | Ni | |
| 2013/0172453 A1* | 7/2013 | Lee et al. | 524/100 |
| 2013/0281587 A1* | 10/2013 | Shim et al. | 524/127 |

FOREIGN PATENT DOCUMENTS

| | | |
|---|---|---|
| JP | 1995-228776 | 8/1995 |
| JP | 2000-204244 A | 7/2000 |
| JP | 2002-294070 A | 10/2002 |
| JP | 2004-075994 A | 3/2004 |
| JP | 2007-218980 | 8/2007 |
| KR | 10-2007-0093994 A | 9/2007 |
| KR | 2007-7026437 A | 12/2007 |
| KR | 2012-0066740 A | 6/2012 |
| WO | 03/085029 A1 | 10/2003 |
| WO | 2012/081801 A1 | 6/2012 |

OTHER PUBLICATIONS

Full Translation of Higuchi et al. JP 2007-218980, pp. 1-32.
Office Action in commonly owned U.S. Appl. No. 13/728,177 mailed Oct. 23, 2013, pp. 1-7.
Office Action in commonly owned U.S. Appl. No. 13/728,177 mailed Feb. 10, 2014, pp. 1-13.
Office Action in commonly owned U.S. Appl. No. 13/332,788 mailed Nov. 28, 2012, pp. 1-8.
Final Office Action in commonly owned U.S. Appl. No. 13/332,788 mailed Jul. 25, 2013, pp. 1-12.
Office Action in commonly owned U.S. Appl. No. 14/067,139 mailed May 22, 2014, pp. 1-8.
International Search Report in commonly owned International Application No. PCT/KR2011/006328 dated Apr. 4, 2012, pp. 1-4.
Office Action in commonly owned U.S. Appl. No. 13/915,655 mailed Mar. 5, 2014, pp. 1-7.
Notice of Allowance in commonly owned U.S. Appl. No. 13/728,177 mailed May 30, 2014, pp. 1-5.
Final Office Action in commonly owned U.S. Appl. No. 13/915,655 mailed Jun. 23, 2014, pp. 1-5.
Notice of Allowance in commonly owned U.S. Appl. No. 13/915,655 mailed Oct. 15, 2014, pp. 1-7.

* cited by examiner

*Primary Examiner* — Peter Szekely

(74) *Attorney, Agent, or Firm* — Additon, Higgins & Pendleton, P.A.

(57) ABSTRACT

A thermoplastic resin composition includes (A) a thermoplastic resin; (B) an inorganic filler; (C) a white pigment; (D) a photostabilizer; and (E) sodium phosphate salt, wherein the thermoplastic resin composition comprises about 0.1 to about 4.7% by weight of the inorganic filler (B) based on 100% by weight of a base resin composition including the thermoplastic resin (A), the inorganic filler (B), and the white pigment (C), wherein the thermoplastic resin composition can have excellent surface gloss, reflectance, anti-yellowing property and moldability.

16 Claims, No Drawings

THERMOPLASTIC RESIN COMPOSITION HAVING EXCELLENT SURFACE GLOSS, REFLECTANCE, ANTI-YELLOWING PROPERTY AND MOLDABILITY

CROSS-REFERENCE TO RELATED APPLICATION

This application claims priority to and the benefit of Korean Patent Application No. 10-2012-0158196, filed in the Korean Intellectual Property Office on Dec. 31, 2012, the entire disclosure of which is incorporated herein by reference.

FIELD OF THE INVENTION

The present invention relates to a thermoplastic resin composition.

BACKGROUND OF THE INVENTION

Recently, high heat resistant thermoplastic resin compositions have been used for parts of light emitting diodes (LEDs). LEDs have rapidly replaced existing plenty of light sources because of their excellent energy efficiency and long life. The high heat resistant thermoplastic resin is used for parts of LEDs including a reflector, a reflector cup, a scrambler, a housing, and the like. For example, a high heat resistant modified-polyamide-based resin, that is a PPA (polyphthalamide)-based resin, can be used as the high heat resistant thermoplastic resin, wherein the high heat resistant modified-polyamide-based resin is reinforced with glass fiber and includes an aromatic ring as a part of its main chain.

The high heat resistant thermoplastic resin should have properties such as tolerance for high temperatures generated during the manufacture of LEDs, high initial whiteness index, and excellent reflectance to be used as parts of LEDs. Simultaneously, the consistent irradiation of light sources causes yellowing, and such yellowing reduces whiteness index. Thus the high heat resistant thermoplastic resin should also minimize such reduction of whiteness index. Non-electro conductivity may also be necessary for the high heat resistant thermoplastic resin used in LEDs.

A reflector, one part of a LED, may be made of various materials, for example, ceramics or heat resistant plastic. Productivity is a problem for the ceramics, and reduction of optical reflectance due to color change is a problem for the heat resistant plastic in case of injection molding, sealant thermal curing, or under actual environmental conditions. Also, when parts of LEDs with complicated and small structures are injection molded, insufficient moldability disturbs thin film molding.

Korean Patent Publication No. 2012-0066740 discloses a polyamide resin composition stated to have excellent reflectance and impact resistance by applying a white pigment, sodium phosphate salt, and glass fiber to a polyamide resin. However, it describes a wide range of amounts of inorganic filler, and an excessive amount of the inorganic filler can reduce surface gloss and moldability thereof.

SUMMARY OF THE INVENTION

The present invention provides a thermoplastic resin composition that can have excellent surface gloss.

The present invention also provides a thermoplastic resin composition that can have excellent reflectance.

The present invention further provides a thermoplastic resin composition that can have excellent moldability.

The present invention further provides a thermoplastic resin composition that can have excellent anti-yellowing properties.

The present invention further provides a thermoplastic resin composition that can have excellent surface gloss, reflectance, moldability, and anti-yellowing properties while maintaining mechanical properties such as impact strength. Accordingly, the thermoplastic resin composition of the present invention may replace existing ceramics or heat resistant plastics which have been used as parts of LEDs.

The thermoplastic resin composition of the present invention comprises (A) a thermoplastic resin, (B) an inorganic filler, (C) a white pigment, (D) a photostabilizer, and (E) sodium phosphate salt, wherein the thermoplastic resin composition may comprise about 0.1 to about 4.7% by weight of the inorganic filler (B) based on 100% by weight of a base resin composition including the thermoplastic resin (A), the inorganic filler (B), and the white pigment (C).

The thermoplastic resin composition of the present invention may comprise about 29.9 to about 70% by weight of the thermoplastic resin (A), about 0.1 to about 4.7% by weight of the inorganic filler (B), about 29.9 to about 70% by weight of the white pigment (C), about 0.01 to about 2 parts by weight of the photostabilizer (D) based on about 100 parts by weight of a base resin composition comprising (A), (B) and (C), and, about 0.01 to about 2 parts by weight of the sodium phosphate salt (E) based on about 100 parts by weight of the base resin composition comprising (A), (B) and (C). The thermoplastic resin (A) may be (a1) an aromatic polyamide resin and/or (a2) a high heat resistant polyester resin.

The aromatic polyamide resin (a1) may be manufactured by polycondensation of a dicarboxylic component including about 10 to about 100 mole % of an aromatic dicarboxylic acid and a $C_4$ to $C_{20}$ aliphatic and/or alicyclic diamine component; and the high heat resistant polyester resin (a2) may be manufactured by polycondensation of an aromatic dicarboxylic acid component and a diol component including alicyclic diol.

The aromatic polyamide resin (a1) may have a melting point of about 200 to about 380° C. and may comprise a repeating unit represented by Chemical Formula 3 as below:

[Chemical Formula 3]

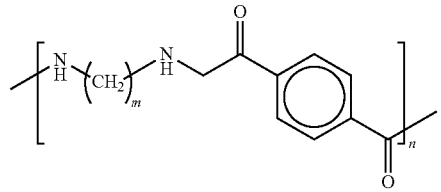

wherein m is an integer from 4 to 12, and n is an integer from 50 to 500.

The high heat resistant polyester resin (a2) has a melting point of about 200 to about 380° C. and may comprise a repeating unit represented by Chemical Formula 4 as below:

[Chemical Formula 4]

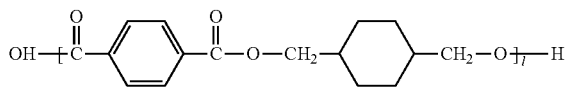

wherein l is an integer from 50 to 500.

The inorganic filler (B) may be carbon fiber, glass fiber, boron fiber, glass beads, glass flakes, carbon black, clay, kaolin, talc, mica, calcium carbonate, wallastonite, potassium titanate whisker, aluminum borate whisker, zinc oxide whisker, calcium whisker, or a combination thereof. The inorganic filler (B) may be wallastonite, and the average length of the wallastonite may be about 0.1 to about 100 μm.

The white pigment (C) may be titanium oxide, zinc oxide, zinc sulfide, white lead, zinc sulfate, barium sulfate, calcium carbonate, aluminum oxide, or a combination thereof.

The photostabilizer (D) may be a benzophenone-based compound, a salicylate-based compound, a benzotriazol-based compound, an acrylonitrile-based compound, a hindered amine-based compound, a hindered phenol-based compound, or a combination thereof.

The sodium phosphate salt (E) may be sodium monohydrogen phosphate, sodium dihydrogen phosphate, sodium phosphate, sodium pyrophosphate, sodium acid pyrophosphate, or a combination thereof.

The present invention also provides molded articles manufactured from the thermoplastic resin composition according to the present invention.

The molded articles manufactured from the thermoplastic resin composition of the present invention may have an initial reflectance of about 90% or more measured using a colorimeter at 440 nm wavelength, reflectance reduction of less than about 4% measured at 440 nm wavelength before/after being left at 85° C. and 85% relative humidity for 300 hours; and a yellowing index change ($^\Delta YI$) of less than about 4 measured before/after being left at 85° C. and 85% relative humidity for 300 hours.

The present invention can provide a thermoplastic resin composition that can have excellent surface gloss, reflectance, moldability, and/or anti-yellowing properties.

DETAILED DESCRIPTION OF THE INVENTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention relates to a thermoplastic resin composition that can have excellent surface gloss, reflectance, moldability, and/or anti-yellowing properties.

Thermoplastic Resin Composition

The thermoplastic resin composition of the present invention may comprise (A) a thermoplastic resin, (B) an inorganic filler, (C) a white pigment, (D) a photostabilizer, and (E) sodium phosphate salt, wherein the thermoplastic resin composition comprises about 0.1 to about 4.7% by weight of the inorganic filler (B) based on 100% by weight of a base resin composition including thermoplastic resin (A), the inorganic filler (B), and the white pigment (C).

The thermoplastic resin composition of the present invention may comprise about 29.9 to about 70% by weight of the thermoplastic resin (A), about 0.1 to about 4.7% by weight of the inorganic filler (B), about 29.9 to about 70% by weight of the white pigment (C), about 0.01 to about 2 parts by weight of the photostabilizer (D) based on about 100 parts by weight of a base resin composition comprising (A), (B) and (C), and about 0.01 to about 2 parts by weight of the sodium phosphate salt (E) based on about 100 parts by weight of the base resin composition comprising (A), (B) and (C).

(A) Thermoplastic Resin (a1) Aromatic Polyamide Resin

The thermoplastic resin of the present invention may be an aromatic polyamide resin (a1).

The aromatic polyamide resin (a1) of the present invention comprises an aromatic ring in its main chain and may be manufactured by polycondensation of a dicarboxylic component including about 10 to about 100 mole % of an aromatic dicarboxylic acid and a $C_4$ to $C_{20}$ aliphatic and/or alicyclic diamine component.

Examples of the monomers of the aromatic dicarboxylic acid can include without limitation a terephthalic acid and/or an isophthalic acid including aromatic rings in their main chains, as represented by Chemical Formulas 1 and 2, respectively, below:

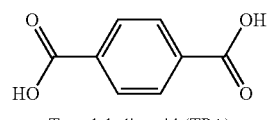

Terephthalic acid (TPA)  [Chemical Formula 1]

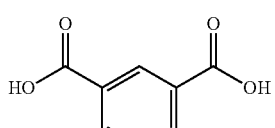

Isophthalic acid (IPA)  [Chemical Formula 2]

A representative aromatic polyamide resin (a1) may comprise a repeating unit represented by Chemical Formula 3 as below:

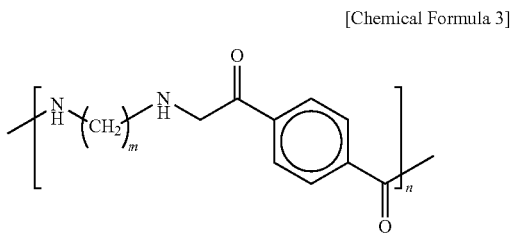

[Chemical Formula 3]

wherein m is an integer from 4 to 12, and n is an integer from 50 to 500.

Representative examples of the aromatic polyamide resin (a1) of Chemical Formula 3 may include without limitation PA6T (m=6) and/or PA10T (m=10). PA6T (m=6) can be manufactured by polycondensation of hexamethylene diamine and terephthalic acid, and PA10T (m=10) can be manufactured by polycondensation of 1,10-decanediamine and terephthalic acid.

The aromatic polyamide resin (a1) of the present invention can have a melting point of about 200° C. or more, for example about 200 to about 380° C., and may be a polymer or copolymer comprising an aromatic ring in (as a part of) its main chain. Specific examples thereof may include without limitation poly(hexamethylene terephthalamide) (PA6T), polycaproamide/poly(hexamethylene terephthalamide) copolymer (PA6/6T), poly(hexamethylene adipamide)/poly(hexamethylene terephthalamide) copolymer (PA66/6T), poly(hexamethylene adipamide)/poly(hexamethylene isophthalamide) copolymer (PA66/6I), poly(hexamethylene terephthalamide)/poly(hexamethylene isophthalamide) copolymer (PA6T/6I), poly(hexamethylene terephthalamide)/polydodecamide copolymer (PA6T/12), poly(hexamethylene adipamide)/poly(hexamethylene terephthalamide)/poly(hexamethylene isophthalamide) copolymer (PA66/6T/6I), poly(hexamethylene terephthalamide)/poly(2-methylpentamethylene terephthalamide) copolymer (PA6T/M5T), poly(nonamethylene terephthalamide) (PA9T), poly(decamethylene terephthalamide) (PA10T), and the like, and combinations thereof.

(a2) High Heat Resistant Polyester Resin

The thermoplastic resin according to the present invention may be a high heat resistant polyester resin (a2).

The materials for LED parts using the thermoplastic resin composition of the present invention should have excellent heat resistant properties in order to tolerate high temperatures generated from manufacturing processes. Thus, the composition can include a basic resin with a high melting point so as to obtain excellent heat resistant properties. However, an excessively high melting point may result in reduction of processibility, and thus it is useful to have a proper melting point. In exemplary embodiments, the high heat resistant polyester resin (a2) of the present invention can have a melting point of about 200° C. or more, for example about 200 to 380° C.

The high heat resistant polyester resin (a2) of the present invention is a structure which comprises an aromatic ring and an alicyclic ring in (as a part of) its main chain, and may be manufactured by polycondensation of an aromatic dicarboxylic component and a diol component including alicyclic diol because a polymer with a ring generally shows a high melting point. Thus, the dicarboxylic component for forming the high heat resistant polyester resin (a2) may include an aromatic dicarboxylic acid and derivatives thereof. Examples of aromatic dicarboxylic acids may include without limitation terephthalic acid, isophthalic acid, phthalic acid, naphthalene carboxylic acid, and the like, and combinations thereof. In exemplary embodiments, terephthalic acid can be used.

The diol component for forming the high heat resistant polyester resin (a2) may include an alicyclic diol, for example 1,4-cyclohexane dimethanol (CHDM), in order to have a ring-shaped repeating unit in (as a part of) its main chain.

In exemplary embodiments, the high heat resistant polyester resin (a2) can include a poly(cyclohexane dimethylene terephthalate) (PCT)-based resin comprising a repeating unit structure represented by Chemical Formula 4 produced by polycondensation of terephthalic acid as the dicarboxylic component and 1,4-cyclohexane dimethanol as the diol component.

[Chemical Formula 4]

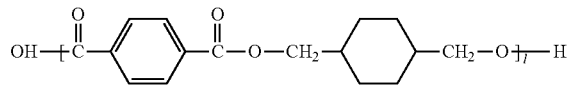

wherein l is an integer from 50 to 500.

The diol component may further comprise ethylene glycol (EG) as an aliphatic diol in addition to 1,4-cyclohexane dimethanol. In exemplary embodiments, the diol component can include about 15 to about 100 mole % of 1,4-cyclohexane dimethanol and about 0 to about 85 mole % of ethylene glycol, for example about 30 to about 100 mole % of 1,4-cyclohexane dimethanol and about 0 to about 70 mole % of ethylene glycol when it comprises ethylene glycol. When the diol component comprises ethylene glycol as a diol component, the high heat resistant polyester resin (a2) can be a glycol modified poly(cyclohexane dimethylene terephthalate) (PCTG) resin or a glycol modified poly(ethylene terephthalate) (PETG) resin.

The diol component can further include one or more $C_6$ to $C_{21}$ aromatic diols and/or $C_3$ to $C_8$ aliphatic diols to modify the high heat resistant polyester resin (a2), and the content thereof can be about 3 or less mole % based on 100 mole % of the diol component. Examples of the $C_6$ to $C_{21}$ aromatic diol and/or the $C_3$ to $C_8$ aliphatic diol can include without limitation propane-1,3-diol, butane-1,4-diol, pentane-1,5-diol, hexane-1,6-diol, 3-methylpentane-2,4-diol, 2-methylpentane-1,4-diol, 2,2,4-trimethylpentane-1,3-diol, 2-ethylhexane-1,3-diol, 2,2-diethylpropane-1,3-diol, 1,4-cyclobutane dimethanol, 2,2-bis-(3-hydroxyethoxyphenyl)-propane, 2,2-bis-(4-hydroxypropoxyphenyl)-propane, and the like, and combinations thereof.

The high heat resistant polyester resin (a2) can have an intrinsic viscosity [η] of about 0.4 to about 1.5 dl/g, for example about 0.5 to about 1.1 dl/g, as measured in an o-chlorophenol solution at 25° C. When the intrinsic viscosity [η] is less than about 0.4 dl/g, the mechanical properties of the thermoplastic resin composition may be reduced; and when the intrinsic viscosity [η] is more than about 1.5 dl/g, the moldability of the thermoplastic resin composition may be reduced.

The high heat resistant polyester resin (a2) can be manufactured by well-known conventional polycondensation procedures, which may include a direct condensation of acid performed by ester exchanging reaction using glycol or low grade alkyl ester.

The thermoplastic resin (A) of the present invention may be included in an amount of about 29.9 to about 70% by weight based on 100% by weight of a base resin composition comprising the thermoplastic resin (A), the inorganic filler (B), and the white pigment (C). In some embodiments, the base resin composition can include the thermoplastic resin (A) in an amount of about 29.9, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amount of the thermoplastic resin (A) can be in a range from about any of the foregoing amounts to about any other of the foregoing amounts.

When the amount of the thermoplastic resin (A) is less than about 29.9% by weight, the heat resistance properties of the thermoplastic resin composition may be reduced; and when it is more than about 70% by weight, the reflectance and mechanical properties of the thermoplastic resin composition may be reduced.

(B) Inorganic Filler

The present invention of the thermoplastic resin composition may comprise an inorganic filler (B) having various particle shapes in order to increase its mechanical properties, heat resistant properties, dimensional stability, and the like.

Any conventional inorganic filler may be used in the present invention. Specific examples thereof may include without limitation carbon fiber, glass fiber, boron fiber, glass beads, glass flakes, carbon black, clay, kaolin, talc, mica, calcium carbonate, and the like, and combinations thereof. Wallastonite, potassium titanate whisker, aluminum borate whisker, zinc oxide whisker, calcium whisker, and combinations thereof may be used as a needle-shaped inorganic filler.

In order to improve adhesion to the thermoplastic resin, the surface of the inorganic filler (B) may be coated with proper organic materials.

When the inorganic filler (B) is used in the thermoplastic resin composition, mechanical properties such as tensile strength, flexural rigidity, and flexural modulus, and heat resistant properties such as the heat deflection temperature of molded articles may be improved.

It is important that the fluidity of the thermoplastic resin composition is ensured in a micro-molding field such as thin film molding of the thermoplastic resin composition. Wallastonite may be used as an inorganic filler in order to improve thin film moldability of the thermoplastic resin composition. When the wallastonite is used for micro-molding applications such as the molding of a thin film of 1 mm or less thickness, excellent heat resistant properties and mechanical properties of the thermoplastic resin composition can be maintained, and moldability thereof can be sufficiently ensured. The average length of the wallastonite may be about 0.1 to about 100 μm, for example about 0.1 to about 20 μm. The bulk density (tapped) of the wallastonite may be in the range of about 0.1 to about 2 g/cm$^3$, for example about 0.1 to about 1 g/cm$^3$. The cross section of the wallastonite is not limited and can be selected according to specific purposes of use. The wallastonite can have a rectangular cross section but any kinds of shapes of the wallastonite may be used in the present invention.

The base resin composition comprising the thermoplastic resin (A), the inorganic filler (B), and the white pigment (C) may include the inorganic filler (B) in an amount of about 0.1 to about 4.7% by weight based on 100% by weight of the base resin composition comprising the thermoplastic resin (A), the inorganic filler (B), and the white pigment (C). In some embodiments, the base resin composition can include the inorganic filler (B) in an amount of about 0.1, 0.2, 0.3, 0.4, 0.5, 0.6, 0.7, 0.8, 0.9, 1, 2, 3, 4, 4.1, 4.2, 4.3, 4.4, 4.5, 4.6, or 4.7% by weight. Further, according to some embodiments of the present invention, the amount of the inorganic filler (B) can be in a range from about any of the foregoing amounts to about any other of the foregoing amounts.

When the amount of the inorganic filler (B) is less than about 0.1% by weight, mechanical properties such as impact strength of the thermoplastic resin composition may be reduced; and the ejection properties thereof may be reduced because the cooling speed of molded articles, which are possibly made of the thermoplastic resin composition, can become slow. When the amount of the inorganic filler (B) is more than about 4.7% by weight, the external appearance of the molded articles can worsen because the inorganic filler can protrude from the surfaces of molded articles made of the thermoplastic resin composition; the fluidity of the thermoplastic resin composition can lead to reduced moldability; and the surface gloss of the molded articles can be degraded due to low whiteness, compared to the white pigment.

(C) White Pigment

The white pigment is used in the present invention as an essential component for obtaining sufficient reflectance.

Examples of the white pigment (C) may include without limitation titanium oxide, zinc oxide, zinc sulfide, white lead, zinc sulfate, barium sulfate, calcium carbonate, aluminum oxide, and the like. The white pigment may be used alone or in combination of two or more thereof.

The white pigment (C) may also be treated with a silane coupling agent and/or a titanium coupling agent. In exemplary embodiments, the surface thereof may be treated with a silane-based compound, such as vinyl triethoxysilane, 3-aminopropyltriethoxysilane, 3-glycydoxypropyltriethoxysilane, and the like and combinations thereof.

The white pigment (C) of the present invention can be titanium dioxide. Optical properties such as reflectance and concealing properties can be improved by using titanium dioxide as the white pigment (C). The titanium dioxide may be conventional titanium dioxide, and the manufacturing methods or diameters thereof are not limited.

The titanium dioxide can be surface treated with an inorganic surface treating agent and/or an organic surface treating agent. Examples of the inorganic surface treating agent may include without limitation aluminum oxide (alumina, $Al_2O_3$), silicon dioxide (silica, $SiO_2$), zirconium dioxide (zirconia, $ZrO_2$), sodium silicate, sodium aluminate, sodium aluminum silicate, zinc oxide, mica, and the like, and combinations thereof. Examples of the organic surface treating agent may include without limitation poly(dimethylsiloxane), trimethylpropane (TMP), pentaerythritol, and the like, and combinations thereof. The inorganic and/or organic surface treating agent can be used in an amount of about 2 or less parts by weight, based on about 100 parts by weight of titanium dioxide. In exemplary embodiments, titanium dioxide of the present invention can be coated with about 2 parts by weight of alumina ($Al_2O_3$) as the inorganic surface treating agent, based on about 100 parts by weight of titanium dioxide.

Titanium dioxide which is surface treated with alumina may be further modified with an inorganic surface treating agent such as silicon dioxide, zirconium dioxide, sodium silicate, sodium aluminate, sodium aluminum silicate, and/or mica, and/or an organic surface treating agent such as poly(dimethylsiloxane), trimethylpropane (TMP), and/or pentaerythritol.

The base resin composition including the thermoplastic resin (A), the inorganic filler (B), and the white pigment (C) may include the white pigment (C) in an amount of about 29.9 to about 70% by weight based on 100% by weight of the base resin composition comprising the thermoplastic resin (A), the inorganic filler (B), and the white pigment (C). In some embodiments, the base resin composition can include the white pigment (C) in an amount of about 29.9, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amount of white pigment can be in a range from about any of the foregoing amounts to about any other of the foregoing amounts.

When the amount of the white pigment (C) is less than about 29.9% by weight, the light resistant properties and reflectance of the thermoplastic resin composition may be reduced; when the amount of the white pigment (C) is more than about 70% by weight, the mechanical properties such as impact resistant properties of the thermoplastic resin composition may be reduced.

(D) Photostabilizer

The thermoplastic resin composition of the present invention may comprise the photostabilizer (D) in order to prevent discoloration and to suppress reflectance reduction.

The photostabilizer (D) may be a compound with ultraviolet ray absorbent properties such as a benzophenone-based compound, a salicylate-based compound, a benzotriazole-based compound, an acrylonitrile-based compound, and other resonance structure compounds; a compound with radical capturing capabilities such as a hindered amine-based compound and a hindered phenol-based compound; or a combination of two or more of the same. Using both the compound with ultraviolet ray absorbent properties and the compound with radical capturing capabilities may show higher effect.

The thermoplastic resin composition can include the photostabilizer (D) in an amount of about 0.01 to about 2 parts by weight, based on about 100 parts by weight of the base resin composition comprising the thermoplastic resin (A), the inorganic filler (B), and the white pigment (C). In some embodiments, the thermoplastic resin composition can include the white pigment (C) in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1 or 2 parts by weight. Further, according to some embodiments of the present invention, the amount of photostabilizer (D) can be in a range from about any of the foregoing amounts to about any other of the foregoing amounts.

When the amount of the photostabilizer (D) is less than about 0.01, the anti-yellowing properties and reflectance of the thermoplastic resin composition may be reduced; and when the amount of the photostabilizer (D) is more than about 2 parts by weight, the reflectance and the anti-yellowing properties of the thermoplastic resin composition may be reduced.

(E) Sodium Phosphate Salt

The sodium phosphate salt (E) of the present invention may be used to obtain sufficient reflectance of the thermoplastic resin composition and ensure thermal discoloration stability, hydrolysis stability, and photostability at the same time.

When both the white pigment (C) and sodium phosphate salt (E) are used in the thermoplastic resin composition at the same time, sufficient whiteness can be obtained in addition to excellent heat discoloration stability. The sodium phosphate salt itself has high whiteness, thus the mixture of the sodium phosphate salt ensures the sufficient reflectance of the thermoplastic resin composition. Further, almost no discoloration and reflectance reduction occur after being left under high temperature/humidity conditions for a long period of time because the thermoplastic resin composition comprises sodium phosphate salt with excellent heat discoloration stability and hydrolysis stability.

Also, the sodium phosphate salt (E) can effectively remove acids which may be generated from a molding operation based on the thermoplastic resin composition. Thus the heat discoloration stability and hydrolysis stability of the thermoplastic resin composition of the present invention can be improved.

Specific examples of the sodium phosphate salt (E) can include without limitation sodium dihydrogen phosphate, sodium monohydrogen phosphate, sodium phosphate, sodium pyrophosphate, sodium acid pyrophosphate, and the like, and combinations thereof. Any sodium phosphate salt may be properly selected and used.

Manufacturing methods and diameters of the sodium phosphate salt (E) are not limited, and surface treated sodium phosphate salt may be used so as to improve comparability to the thermoplastic resin (A) and dispersibility in a thermoplastic resin matrix.

A silane coupling agent, such as silane, epoxy silane, and the like, and organic materials, such as a titanium coupling agent, an organic acid, polyol, silicon, and the like, as well as combinations thereof, may be used as the surface treating agent.

The thermoplastic resin composition may include the sodium phosphate salt (E) in an amount of about 0.01 to about 2 parts by weight, based on about 100 parts by weight of the base resin composition comprising the thermoplastic resin (A), the inorganic filler (B), and the white pigment (C). In some embodiments, the thermoplastic resin composition can include the sodium phosphate salt (E) in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1 or 2 parts by weight. Further, according to some embodiments of the present invention, the amount of sodium phosphate salt (E) can be in a range from about any of the foregoing amounts to about any other of the foregoing amounts.

When the amount of the sodium phosphate salt (E) is less than about 0.01 parts by weight, the reflectance of the thermoplastic resin composition may be reduced; and when the amount of the sodium phosphate salt (E) is more than about 2 parts by weight, the impact resistance properties and anti-yellowing properties of the thermoplastic resin composition may be reduced.

(F) Additives

The thermoplastic resin composition of the present invention may further comprise additional additive(s) (F). Examples the additives can include without limitation fluorescent whitening agents, lubricants, release agents, nucleating agents, anti-static agents, stabilizers, reinforcements, inorganic additives, pigments, dyes, and the like and combinations thereof.

The additives (F) may be included in an amount of about 0.01 to about 20 parts by weight based on about 100 parts by weight of the base resin composition comprising the thermoplastic resin (A), the inorganic filler (B), and the white pigment (C).

The fluorescent whitening agent can improve the reflectance of the thermoplastic resin composition. Examples of the fluorescent whitening agent can include without limitation stilbene-bisbenzoxazol derivatives such as 4-(benzoxazol-2-yl)-4'-(5-methylbenzoxazol-2-yl)stilbene, 4,4'-bis(benzoxazol-2-yl)stilbene, and the like, and combinations thereof.

Examples of the release agent can include without limitation fluorine-containing polymers, silicon oils, metal salts of stearic acid, metal salts of montanic acid, ester waxes of montanic acid, polyethylene wax, and the like, and combinations thereof.

Examples of the nucleating agent may include without limitation talc, clay, and the like, and combinations thereof.

The thermoplastic resin composition of the present invention may be manufactured by well-known manufacturing methods of resin composition. For example, the components and other additives of the present invention can be simultaneously mixed, and then melt-extruded to be shaped into pellets or chips within an extruder.

Molded Articles

The present invention also provides molded articles manufactured from the thermoplastic resin composition. The molded articles are molded without specific limitations, and extrusion molding, injection molding, hollow molding, compression molding, or casting molding methods may be used to manufacture the molded articles. Such molding methods may be easily carried out by those skilled in the art.

The molded articles manufactured from the thermoplastic resin composition of the present invention can have a spiral flow length of about 200 to about 300 mm, for example about 200 to about 270 mm which is measured under a molding temperature of 130° C. and injection molding temperature of 330° C., wherein a mold has a 0.5 mm×5 mm (thick×width) spiral cavity.

The molded articles manufactured from the thermoplastic resin composition of the present invention can have an initial reflectance of about 90% or more, for example about 92 to about 98% measured using a colorimeter at 440 nm wavelength, reflectance reduction of less than about 4% measured at 440 nm wavelength before/after being left at 85° C. and 85% relative humidity for 300 hours, and a yellowing index change (ΔYI) of less than about 4 measured before/after being left at 85° C. and 85% relative humidity for 300 hours.

The molded articles manufactured from the thermoplastic resin composition of the present invention can have an Izod impact strength of about 2 to about 10 kgf·cm/cm, for example about 2 to about 7 kgf·cm/cm measured for a ⅛ inch thick specimen at 23° C. in accordance with ASTM D256. The molded articles manufactured from the thermoplastic resin composition of the present invention can have a surface gloss of about 90 to about 99%, for example about 92 to about 97% measured using a UGV-6P gloss meter manufactured by SUGA Inc. for a 2.5 mm thick specimen at an angle of 60°.

The thermoplastic resin composition of the present invention can have excellent surface gloss, reflectance, moldability, and anti-yellowing properties, and thus may be used in the molding of various articles. Specifically, the thermoplastic resin composition of the present invention may have excellent surface gloss, reflectance, and moldability by comprising the proper amount of the inorganic filler, the white pigment, the photostabilizer, and the sodium phosphate salt at the same time. It further can have excellent anti-yellowing properties and hydrolysis stability like reflectance and yellowing index thereof maintained after being left for a long period of time under conditions of high temperature/high humidity. Accordingly, it may be used as materials for an LED reflector which is constantly exposed to high temperature/high humidity environment.

The thermoplastic resin composition of the present invention may be applicable for any use of reflecting other rays besides reflectors of LEDs. For example, it may be used as reflectors of light emitting devices such as various TVs, smart phones, tablet PCs, electric/electronic parts, indoor illuminations, outdoor illuminations, vehicle illuminations, display devices, head lights, and the like.

The present invention will be further exemplified in the following examples, which are intended for the purpose of illustration and are not to be construed as in any way limiting the scope of the present invention defined by attached claims.

EXAMPLES AND COMPARATIVE EXAMPLES

The particulars of the thermoplastic resin (A), the inorganic filler (B), the white pigment (C), the photostabilizer (D), and the sodium phosphate salt (E) used in the Examples and Comparative Examples of the present invention are as follows:

(A) Thermoplastic Resin (a11) Aromatic Polyamide Resin (PA10T)

PA10T, an aromatic polyamide resin manufactured by polycondensation of terephthalic acid and 1,10-decane diamine is used, wherein it has a melting point of 315° C. and comprises an aromatic ring in its main chain.

(a12) Aromatic Polyamide Resin (PA6T)

PA6T, an aromatic polyamide resin manufactured by polycondensation of terephthalic acid and hexamethylene diamine is used, wherein it has a melting point of 325° C. and comprises an aromatic ring in its main chain.

(a2) High Heat Resistant Polyester Resin (PCT)

Poly(cyclohexane dimethylene terephthalate) (PCT), a high heat resistant polyester resin manufactured by polycondensation of terephthalic acid and 1,4-cyclohexane dimethanol is used, wherein it has a melting point of 290° C. and an intrinsic viscosity [η] of 0.6 dl/g.

(B) Inorganic Filler

Wallastonite having an average length of 2.2 μm and a bulk density of 0.77 g/cm$^3$ (Product name: NYAD 5000) manufactured by NYCO Corporation is used as the inorganic filler.

(C) White Pigment

Titanium dioxide (Product name: KRONOS 2233) manufactured by KRONOS Corporation is used as the white pigment.

(D) Photostabilizer

Photostabilizer (Product name: CHIMASSORB 944) manufactured by BASF Corporation is used.

(E) Sodium Phosphate Salt

Sodium acid pyrophosphate manufactured by INNOPHOS Corporation is used as the sodium phosphate salt.

(F) Heat Stabilizer

Heat stabilizer (Product name: Sumilizer GA-80) manufactured by SUMITOMO Corporation is used in Comparative Example 5.

Examples 1 to 7 and Comparative Examples 1 to 6

The respective components are added according to the amounts of Table 1 below, and then are molten/kneaded in a biaxial melting extruder heated to 240 to 350° C. in order to obtain resin compositions in the state of pellets. The pellets obtained by the same are dried at 130° C. for 5 hours or more, and specimens for property evaluation are manufactured using a screw type extruder heated to 240 to 330° C.

In Table 1 below, the mixing ratio of (A), (B), and (C) is represented by % by weight based on 100% by weight of (A), (B), and (C); and (D), (E), and (F) are represented by parts by weight based on 100 parts by weight of the base resin composition of (A), (B), and (C).

TABLE 1

| Components | | Examples | | | | | | | Comparative Examples | | | | | |
|---|---|---|---|---|---|---|---|---|---|---|---|---|---|---|
| | | 1 | 2 | 3 | 4 | 5 | 6 | 7 | 1 | 2 | 3 | 4 | 5 | 6 |
| (A) | (a11) | 50 | — | — | — | 55 | 55 | 55 | 55 | — | 55 | 55 | 55 | 55 |
| | (a12) | — | 50 | — | — | — | — | — | — | 55 | — | — | — | — |
| | (a2) | — | — | 55 | 40 | — | — | — | — | — | — | — | — | — |
| (B) | | 2 | 3 | 4.7 | 4.5 | 4.2 | 0.5 | 1 | 15 | 15 | — | 8 | 4.2 | 3 |
| (C) | | 48 | 47 | 40.3 | 55.5 | 40.8 | 44.5 | 44 | 30 | 30 | 45 | 37 | 40.8 | 42 |
| (D) | | 1.0 | 0.5 | 1.0 | 0.5 | 0.5 | 0.5 | 0.5 | 1.0 | 2.0 | 2.0 | 0.5 | 0.5 | 5.0 |
| (E) | | 0.5 | 1.0 | 1.0 | 1.5 | 1.5 | 1.5 | 1.5 | 0.5 | 1.0 | 1.0 | 1.5 | — | 1.5 |
| (F) | | — | — | — | — | — | — | — | — | — | — | — | 1.5 | — |

The properties of the manufactured specimens are measured using the below methods, and the results thereof are set forth in Table 2.

(1) Thin film moldability (Spiral flow length): the composition is injection molded using a mold with a spiral cavity of 0.5 mm thickness×5 mm width at 130° C. molding temperature and 330° C. injection temperature, and then a length filled in the mold is measured.

(2) Reflectance (Reflectivity): Initial reflectance (SCI, specular component included) at 440 nm wavelength is measured using a Konica Minota Corporation 3600D CIE Lab. colorimeter, and then the reflectance is re-measured after being left at 85° C. 85% relative humidity for 300 hours so as to evaluate the reduction of reflectance.

(3) Anti-yellowing property (Yellow index): Initial yellowing index (YI) is measured using a Konica Minolta Corporation 3600D CIE Lab. colorimeter, and then the yellowing index is re-measured after being left at 85° C. and 85% relative humidity for 300 hours so as to evaluate the change of yellowing index.

(4) Impact resistant properties (Izod impact strength): Izod impact strength is measured for a ⅛ inch thick specimen in accordance with ASTM D256 at 23° C.

(5) Surface gloss: Surface gloss is measured for a 2.5 mm thick specimen at an angle of 60° using a UGV-6P gloss meter manufactured by SUGA Corporation.

(6) LED part moldability: Non-molding and ejection properties during the cooling time of molded articles are confirmed when a resin composition is injection molded at 300° C. injection temperature and 130° C. molding temperature using a 750 ton injector based on a specific mold equipping 48 cavities with the cup-shaped LED reflector structures of 8 mm length, 1.5 mm height, and 40 to 100 μm wall thickness.

Moldability (○): The surfaces of the molded articles are excellent because they are cooled within a predetermined time (15 seconds)

Moldability (x): The surfaces of the molded articles are poor because the surfaces of the molded articles are insufficiently cooled Ejection properties (○): Ejection is possible within a predetermined time (15 seconds)

Ejection properties (x): Ejection is impossible within a predetermined time (15 seconds)

As shown in Table 2 the thermoplastic resin compositions of Examples 1 to 7 according to the present invention have excellent thin film moldability, moldability, reflectance, and anti-yellowing properties while the reduction of impact resistance properties and surface gloss is prevented.

However, Comparative Examples 1, 2, and 4 using the inorganic filler (B) in an amount outside of the range of the present invention do not have excellent thin film moldability, and the molded articles thereof have poor surfaces due to insufficient moldability when parts of LEDs with specific structures are injection molded. Comparative Example 3 which does not include the inorganic filler (B) has a disadvantage that the moldability of parts of LEDs is possibly ensured when they are injection molded, however, it is difficult to ensure ejection properties thereof. Properties such as impact resistant properties thereof are also reduced. In Comparative Example 5 using another heat stabilizer (F) instead of sodium phosphate salt (E), reflectance and anti-yellowing properties thereof are reduced. In Comparative Example 6 using an excessive amount of the photostabilizer (D) beyond the range of the present invention, the reduction of reflectance and anti-yellowing property thereof are confirmed.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A thermoplastic resin composition comprising (A) about 29.9 to about 70% by weight of a thermoplastic resin; (B) about 0.1 to about 4.7% by weight of an inorganic filler; (C) about 29.9 to about 70% by weight of a white pigment; (D) about 0.01 to about 2 parts by weight of a photostabilizer; and (E) about 0.01 to about 2 parts by weight of a sodium phosphate salt, wherein the amounts of the thermoplastic resin (A), the inorganic filler (B), and the white pigment (C) are based on 100% by weight of a base resin composition including the thermoplastic resin (A), the inorganic filler (B), and

TABLE 2

| | | Examples | | | | | | | Comparative Examples | | | | | |
|---|---|---|---|---|---|---|---|---|---|---|---|---|---|---|
| | | 1 | 2 | 3 | 4 | 5 | 6 | 7 | 1 | 2 | 3 | 4 | 5 | 6 |
| Spiral flow length (mm) | | 232 | 220 | 245 | 247 | 245 | 249 | 248 | 174 | 147 | 265 | 188 | 244 | 245 |
| Reflectance (%) | Before isothermal/isohumidity | 94.9 | 94.8 | 95.1 | 95.0 | 95.0 | 95.1 | 95.2 | 93.2 | 92.8 | 94.6 | 93.4 | 95.0 | 95.1 |
| | After isothermal/isohumidity | 93.2 | 92.8 | 93.3 | 93.2 | 93.5 | 93.5 | 93.4 | 92.1 | 90.4 | 82 | 88.5 | 82.0 | 74.0 |
| | Reflectance difference | 1.7 | 2.0 | 1.8 | 1.8 | 1.5 | 1.6 | 1.8 | 1.1 | 2.4 | 12.6 | 4.9 | 13.0 | 21.1 |
| Yellowing index (—) | Before isothermal/isohumidity | 2.9 | 3.1 | 3.2 | 2.9 | 3.0 | 2.9 | 3.0 | 4.1 | 4.3 | 3.3 | 4.0 | 3.8 | 6.2 |
| | After isothermal/isohumidity | 4.2 | 4.4 | 4.5 | 4.7 | 4.8 | 4.5 | 4.6 | 5.2 | 5.5 | 7.9 | 5.8 | 14.2 | 18.4 |
| | Yellowing index difference | 1.3 | 1.3 | 1.3 | 1.8 | 1.8 | 1.6 | 1.6 | 1.1 | 1.2 | 4.6 | 1.8 | 10.4 | 12.2 |
| Izod impact strength (kgf · cm/cm) | | 3.2 | 3.3 | 3.2 | 3.3 | 3.2 | 3.3 | 3.2 | 3.4 | 3.5 | 1.8 | 4.5 | 3.3 | 3.4 |
| Surface gloss (%) | | 94.5 | 95.0 | 94.7 | 95.2 | 95.1 | 95.9 | 95.7 | 87.8 | 88.2 | 95.0 | 91.5 | 95.1 | 94.8 |
| LED part moldability | Moldability | ○ | ○ | ○ | ○ | ○ | ○ | ○ | x | x | ○ | x | ○ | ○ |
| | Ejection properties | ○ | ○ | ○ | ○ | ○ | ○ | ○ | ○ | ○ | x | ○ | ○ | ○ | the white pigment (C), and wherein the amounts of the photostabilizer (D) and the sodium phosphate salt (E) are based on about 100 parts by weight of the base resin composition comprising (A), (B) and (C).

2. The thermoplastic resin composition of claim 1, wherein the thermoplastic resin (A) is (a1) an aromatic polyamide resin, (a2) a high heat resistant polyester resin, or a combination thereof.

3. The thermoplastic resin composition of claim 2, wherein the aromatic polyamide resin (a1) is manufactured by polycondensation of a dicarboxylic component comprising about 10 to about 100 mole% of an aromatic dicarboxylic acid and a diamine component including a $C_4$ to $C_{20}$ aliphatic, alicyclic diamine or a combination thereof.

4. The thermoplastic resin composition of claim 2, wherein the high heat resistant polyester resin (a2) is manufactured by polycondensation of an aromatic dicarboxylic acid component and a diol component comprising alicyclic diol.

5. The thermoplastic resin composition of claim 2, wherein the aromatic polyamide resin (a1) has a melting point of 200 to 380 ° C. and a repeating unit represented by Chemical Formula 3 as below:

[Chemical Formula 3]

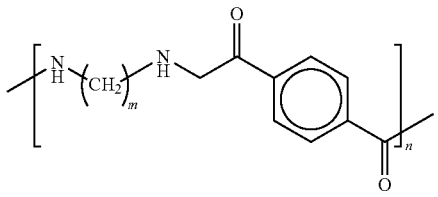

wherein m is an integer from 4 to 12, and n is an integer from 50 to 500.

6. The thermoplastic resin composition of claim 2, wherein the high heat resistant polyester resin (a2) has a melting point of 200 to 380° C. and comprises a repeating unit represented by Chemical Formula 4:

[Chemical Formula 4]

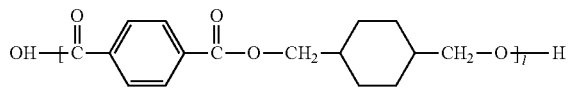

wherein l is an integer from 50 to 500.

7. The thermoplastic resin composition of claim 1, wherein the inorganic filler (B) comprises carbon fiber, glass fiber, boron fiber, glass beads, glass flakes, carbon black, clay, kaolin, talc, mica, calcium carbonate, wollastonite, potassium titanate whisker, aluminum borate whisker, zinc oxide whisker, calcium whisker, or a combination thereof.

8. The thermoplastic resin composition of claim 1, wherein the inorganic filler (B) is wollastonite.

9. The thermoplastic resin composition of claim 8, wherein the wollastonite has an average length of about 0.1 to about 100 μm.

10. The thermoplastic resin composition of claim 1, wherein the white pigment (C) comprises titanium oxide, zinc oxide, zinc sulfide, white lead, zinc sulfate, barium sulfate, calcium carbonate, aluminum oxide, or a combination thereof.

11. The thermoplastic resin composition of claim 1, wherein the photostabilizer (D) comprises a benzophenone-based compound, a salicylate-based compound, a benzotriazol-based compound, an acrylonitrile-based compound, a hindered amine-based compound, a hindered phenol-based compound, or a combination thereof.

12. The thermoplastic resin composition of claim 1, wherein the sodium phosphate salt (E) comprises sodium monohydrogen phosphate, sodium dihydrogen phosphate, sodium phosphate, sodium pyrophosphate, sodium acid pyrophosphate, or a combination thereof.

13. A molded article comprising the thermoplastic resin composition of the claim 1.

14. The molded article of claim 13, wherein the molded article has an initial reflectance of about 90% or more measured using a colorimeter at 440 nm wavelength;
reflectance reduction of less than about 4% measured at 440 nm wavelength before and after being left at 85° C. and 85% relative humidity for 300 hours; and a yellowing index change (ΔYI) of less than about 4 measured before and after being left at 85° C. and 85% relative humidity for 300 hours.

15. The molded article of claim 14, wherein the molded article is LED reflector.

16. The thermoplastic resin composition of claim 1, wherein a molded article formed of the composition has a spiral flow length of about 200 to about 300 mm measured under a molding temperature of 130 ° C. and injection molding temperature of 330 ° C., wherein a mold has a 0.5 mm ×5 mm (thick ×width) spiral cavity.

* * * * *